(12) United States Patent
McMahan et al.

(10) Patent No.: US 7,035,928 B2
(45) Date of Patent: Apr. 25, 2006

(54) ALLOCATING COMPUTER RESOURCES FOR EFFICIENT USE BY A PROGRAM

(75) Inventors: Larry N McMahan, Fremont, CA (US); Steven Roth, San Jose, CA (US); James E. Kleeb, Saratoga, CA (US); Guy L. Kuntz, Chico, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 821 days.

(21) Appl. No.: 09/842,969

(22) Filed: Apr. 25, 2001

(65) Prior Publication Data

US 2002/0161902 A1    Oct. 31, 2002

(51) Int. Cl.
*G06F 15/173* (2006.01)
*G06F 15/167* (2006.01)
*G06F 15/16* (2006.01)
*G06F 9/00* (2006.01)
*G06F 9/46* (2006.01)

(52) U.S. Cl. ............... 709/226; 709/212; 709/216; 709/229; 718/104; 713/2

(58) Field of Classification Search ............... 709/224, 709/212, 216, 222, 226, 229; 718/104; 713/2
See application file for complete search history.

(56) References Cited

U.S. PATENT DOCUMENTS

| | | | |
|---|---|---|---|
| 6,249,802 B1* | 6/2001 | Richardson et al. | 709/200 |
| 6,304,913 B1* | 10/2001 | Rune | 709/241 |
| 6,606,643 B1* | 8/2003 | Emens et al. | 709/203 |
| 6,724,757 B1* | 4/2004 | Zadikian et al. | 370/388 |
| 6,732,264 B1* | 5/2004 | Sun et al. | 713/2 |
| 2002/0038360 A1* | 3/2002 | Andrews et al. | 709/223 |
| 2004/0083289 A1* | 4/2004 | Karger et al. | 709/226 |

* cited by examiner

*Primary Examiner*—Bunjob Jaroenchonwanit
*Assistant Examiner*—Ramsey Refai
(74) *Attorney, Agent, or Firm*—Tuan V. Ngo

(57) ABSTRACT

The present invention, in various embodiments, provides techniques for allocating resources for efficient use by a program. In one embodiment, a method implementing the techniques comprises the steps of identifying an I/O device connected to a storage device storing data associated with the program, and allocating memory arrays and a processor both of which having a shortest distance to the I/O device. In one embodiment, the resources reside in a plurality of nodes each of which includes one or a combination one or more of an I/O device, memory arrays, and a processor. Further, the resources are grouped in a node if they are on the same system bus or if they are connected to a chip providing point-to-point links to resources. In one embodiment, the relative distance between the resources is stored in a table embedded in firmware portable from one operating system to another operating system. As a result, the table, or the system using the table, may be referred to as platform neutral, system neutral, or operating system neutral.

27 Claims, 4 Drawing Sheets

ALLOCATING COMPUTER RESOURCES FOR EFFICIENT USE BY A PROGRAM

FIELD OF THE INVENTION

The present invention relates generally to computer resource allocation and, more specifically, to allocating resources for efficient use by a program.

BACKGROUND OF THE INVENTION

Computer resources in large systems do not usually reside in the same place but are distributed in various locations or nodes. Using a set of resources in far-apart locations can degrade system performance because of the long time it takes for the data to be processed by different resources, or for one resource to communicate with another resource, etc. An intelligent computer system may be able to allocate resources closer to each other. However, this system usually requires an operating system (OS) program to be fully aware of the platform or system topology including the particular location of each of the resources, how these resources are connected, etc. In these conditions, a system can work with only one topology. If the topology is changed, then the operating system needs to be reconfigured for it to learn the new topology. Further, one topology may be suitable for one particular operating system but not for another one.

Based on the foregoing, it is clearly desirable that mechanisms be provided to solve the above deficiencies and related problems.

SUMMARY OF THE INVENTION

The present invention, in various embodiments, provides techniques for allocating resources for efficient use by a program. In one embodiment, a set of resources includes one or more I/O devices connected to an I/O controller, memory arrays connected to a memory controller, and a processor. Further, a method implementing the embodiment comprises the steps of identifying an I/O device connected to a storage device storing data associated with the program, and allocating memory arrays and a processor each of which having a shortest distance to the I/O device.

In one embodiment, the resources reside in a plurality of nodes each of which includes one or a combination of an I/O device, memory arrays, and a processor. Further, the resources are grouped in a node if they are on the same system bus or if they are connected to a single node-controller chip providing point-to-point links to resources.

In one embodiment, the relative distance between the resources is stored in a table embedded in firmware portable from one operating system to another operating system. As a result, the table, or the system using the table, may be referred to as platform neutral, system neutral, or operating system neutral.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION OF THE PREFERRED EMBODIMENT

The present invention, in various embodiments, provides techniques for allocating resources for efficient use by a program. In one embodiment, a set of resources includes I/O devices, memory arrays, and processors arranged in nodes, which are in turn connected together by an interconnect fabric consisting of point-to-point links through crossbar chips between the nodes. However, techniques of the invention are applicable to different sets of resources that may include, for example, a collection of computers, each acting as a single node, with a network interconnect such as Local Area Networking (LAN), Wide Area Networking (WAN), or some other networking interface. In the following description, for the purposes of explanation, numerous specific details are set forth in order to provide a thorough understanding of the invention. However, it will be apparent to one skilled in the art that the invention may be practiced without these specific details. In other instances, well-known structures and devices are shown in block diagram form in order to avoid obscuring the invention.

HARDWARE OVERVIEW

Figure 1:
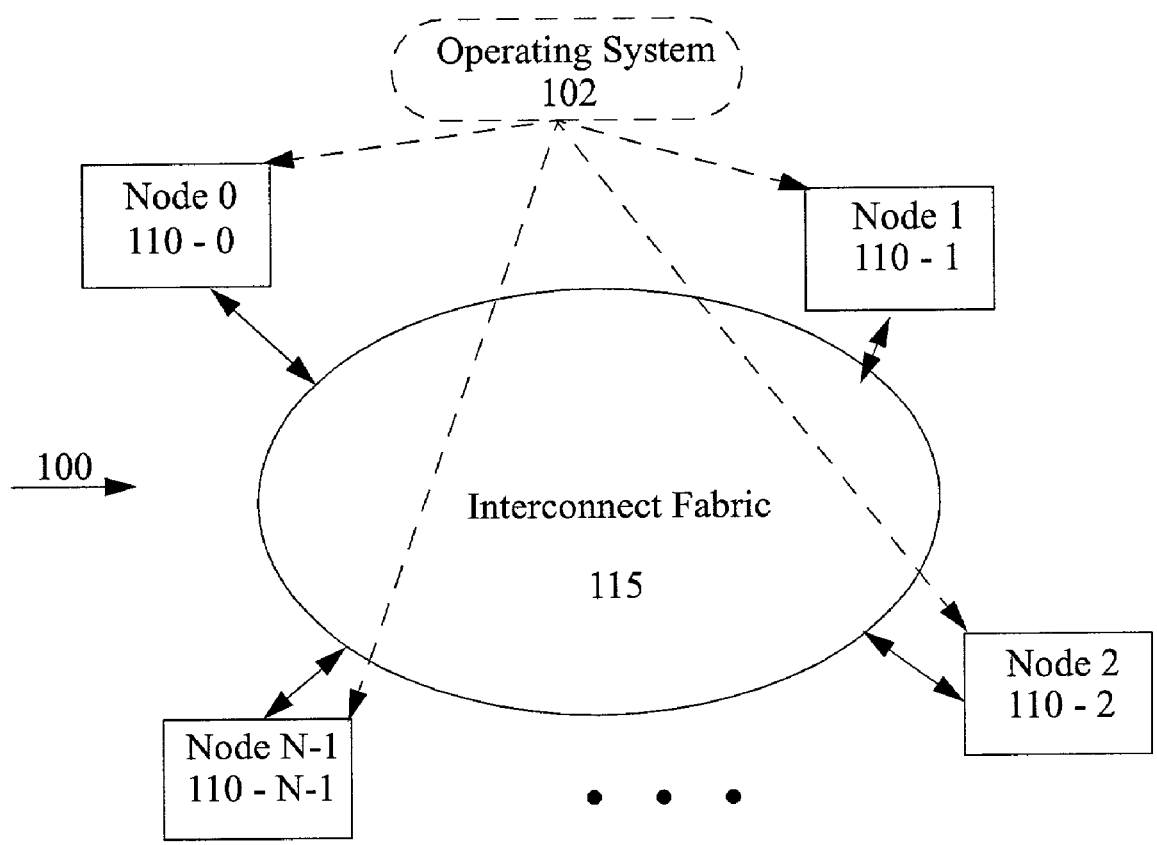
FIG. 1 shows a system comprising multiple nodes in accordance with one embodiment.

FIG. 1 shows an exemplary system 100 upon which embodiments of the invention may be implemented. System 100 includes an operating system 102 managing a collection of N nodes 110-0, 110-1, . . . , 110-N-1 connected by an Interconnect Fabric 115.

THE OPERATING SYSTEM

In one embodiment, a single instance of operating system 102 runs on system 100 and manages all resources in nodes 110. Operating system 102 may be any operating system including, for example, Hewlett-Packard HP-UX, Microsoft Windows, Linux, etc. Operating system 102 may run on any of the processors within nodes 110 that it is managing. Operating system 102, controlling resources of system 100, allocates these resources as appropriate for use by user application programs. For example, operating system 102, based on a close-distance algorithm, may allocate an I/O device in node 110-1, a memory device in node 110-3, and a processor in node 110-5, etc., or may allocate all resources in the same node 110. In one embodiment, operating system 102 is provided with the relative distance between nodes 110 from which operating system 102 allocates resources. Therefore, operating system 102 does not need to know the system topology, e.g., how nodes 110 or how the resources in nodes 110 are connected. In one embodiment, operating system 102, upon power-up, receives via firmware the relative distance between nodes 110 from a read-only memory (ROM) or its equivalence, e.g., programmable read-only memory (PROM), erasable programmable read-only memory (EPROM), etc.

THE INTERCONNECT FABRIC

In one embodiment, Interconnect Fabric 115 comprises node-controller chips and crossbar chips by Hewlett-Packard Company of Palo Alto, Calif. However, Interconnect Fabric 115 may include other node-connecting mechanisms including an interconnect network using communications protocols such as TCP.

In one embodiment, a node-controller chip can connect up to one I/O controller, one memory controller, four processors, and four crossbar chips. Two resources connected to the same node-controller chip are said to have a point-to-point link through that chip. A node controller chip may be referred to as a hub. Resources connected to separate hubs are considered farther apart than resources connected directly to the same hub because communications must pass through multiple links and a crossbar chip, which takes additional time. A crossbar chip, on one side, connects to node controller chips, and, on the other side, connects to either crossbar chips or other interconnect chips. Those skilled in the art will recognize that a larger system 100 would have a larger number of node-controller and crossbar chips. Conversely, a smaller system 100 would have a smaller number of those chips.

THE NODES

A node 110 comprises one or more resources used by system 100. A node 110 can also be a computer node. In one embodiment, a node 110 includes one or a combination of one or more of an I/O controller connected to I/O devices, a memory controller connected to memory arrays, and one or more processors. A user program, using I/O devices, memory arrays, and a processor, is assigned these resources that may reside in the same node 110 or in different nodes 110.

Figure 2:
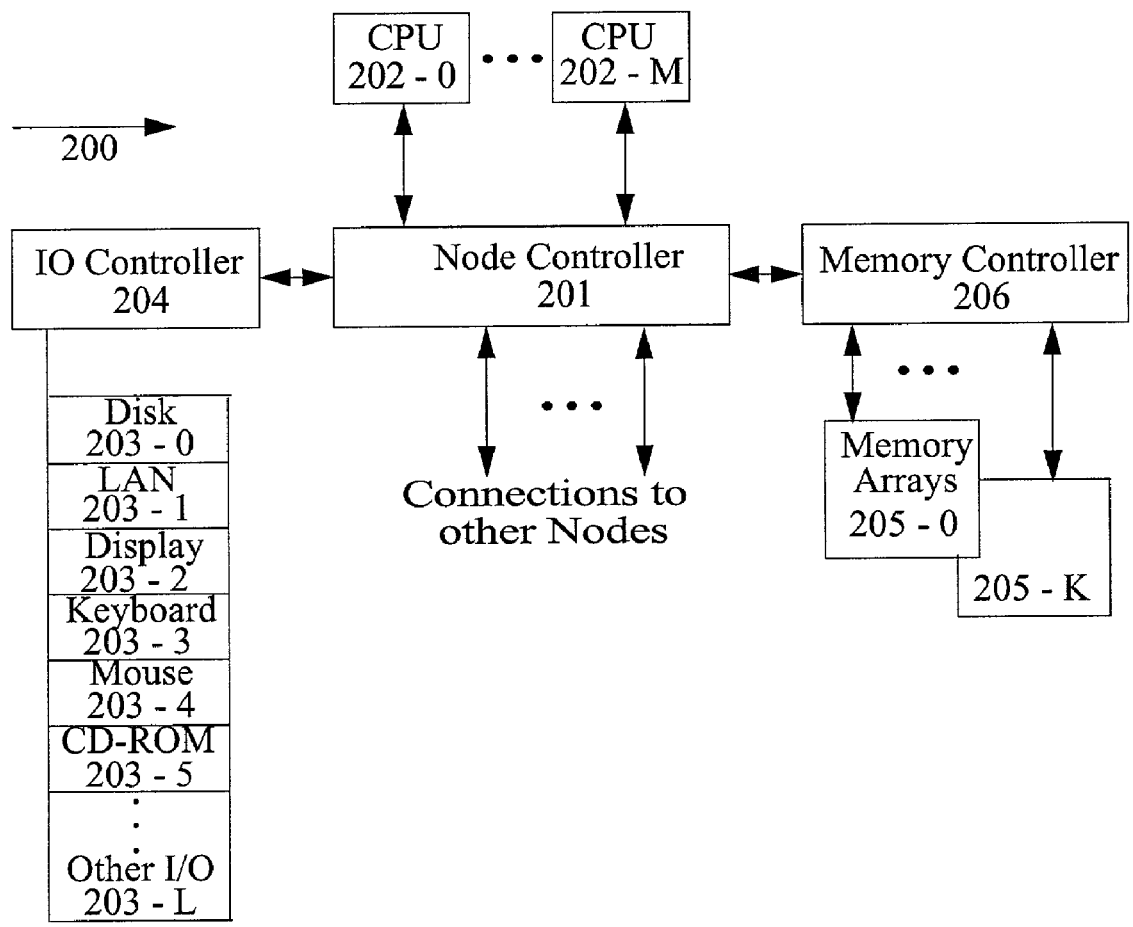
FIG. 2 shows a first embodiment of a node in FIG. 1.

Resources in nodes 110 can be connected in various ways. FIG. 2 shows a first embodiment of a node 110 as a node 200 in which resources are connected directly to a node-controller chip without intervening of a crossbar chip. Node 200 includes a node-controller chip 201, a plurality of processors (CPU) 202, I/O devices 203 connected to an I/O controller 204, and memory arrays 205 connected to a memory controller 206. CPUs 202, I/O controller 204, and memory controller 206 are directly connected to node-controller chip 201. Exemplary I/O devices include storage devices, such as disk, CDROM, or DVD, and network interface cards (NICs) which connect to Local Area Networks or Wide Area Networks, etc. Other I/O devices also include display devices, printers, keyboards, and mice, etc. Those skilled in the art will recognize that a LAN card is connected to a communications network, a disk card is connected to a disk drive, etc.

Figure 3:
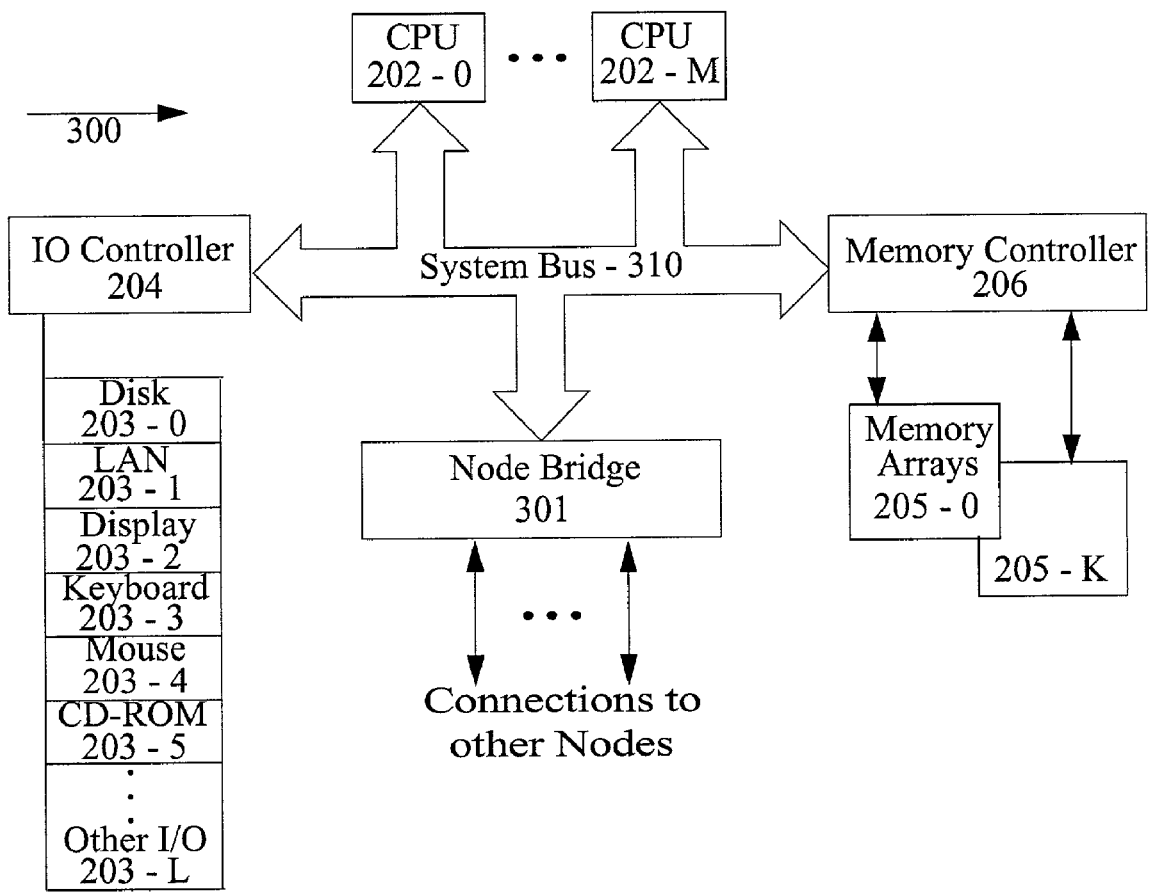
FIG. 3 shows a second embodiment of a node in FIG. 1.

FIG. 3 shows a second embodiment of node 110 as a node 300 in which resources are connected to the same system bus and they see the same transaction on that bus at the same time. In this FIG. 3 embodiment, node 300 is the same as node 200 except that a system bus 310 and a bridge 301 replace node controller 201 in node 200.

A multi-node system embodying techniques of the invention may comprise a collection of nodes 110, nodes 200, nodes 300, or a combination of those nodes. Grouping resources in their respective nodes rather than making each resource an individual table entry in the below table 400 reduces the total number of table entries. This reduces the size of table 400, and thereby reduces both the memory space required for the table, and the time required to process information in that table.

ALLOCATING RESOURCES

Computer resources are usually allocated for use by a program. In one embodiment, a user program is allocated a set of resources including a processor, one or more I/O devices, and memory arrays. Generally, each of an I/O device or memory arrays is connected to an appropriate controller device. Further, these resources are selected such that they are as close to each other as possible. The distance between two resources can be measured by a physical distance or by time, such as the communication time from one resource to another resource, the time to transfer data from one resource to another resource, etc. Consequently, the two resources are closer if the communication time between them is short, and they are far apart if the time is long. Similarly, resources in the same node communicate with each other relatively faster than if they were in different nodes. Since resources are selected closer to each other, the time taken to complete a task using these resources can be greatly reduced.

In one embodiment, when resources are allocated for a user program, an I/O device is first selected, then memory arrays and a processor having a shortest distance from the I/O device are selected. Because resources in the same node have a shorter distance than resources in different nodes, a memory device or a processor in the same node with the I/O device are preferred to those in nodes other than the node containing the I/O device. If memory arrays or a processor is not available in the node in which the first selected I/O devices resides, then memory arrays or a processors are selected in the separate node which is closest (least communication time) to the node in which the selected I/O device resides. In one embodiment, the I/O device is first selected if the I/O device is connected to a storage device storing the program or application data used by the program.

Selecting an I/O device first as described above is used only as an example, techniques of the invention are applicable in situations where close resources are selected for efficient performance. For example, one embodiment selects any first resource, then selects other resources based on the shortest distance to the first selected resource. In such conditions, each of the second resource, the third resource, the fourth resource, etc., is closest to the first resource. Alternatively, the second resource is selected closest to the first resource, the third resource is closest to the second resource, the fourth resource is closest to the third resource, etc.

DISTANCES BETWEEN RESOURCES

In one embodiment, since the resources are in nodes 110, the distance between resources may be treated as the distance between nodes 110. These distances can be absolute, i.e., measured between one resource to another resource in time units, e.g., microseconds, nanoseconds, etc. Alternatively, these distances can be relative, i.e., measured relative to a distance used as a reference. Relative distance provides the full criteria for choosing the resources, is more accurate, and is not subject to becoming obsolete due to technology change, which can change the size of the absolute value measurements.

Figure 4:
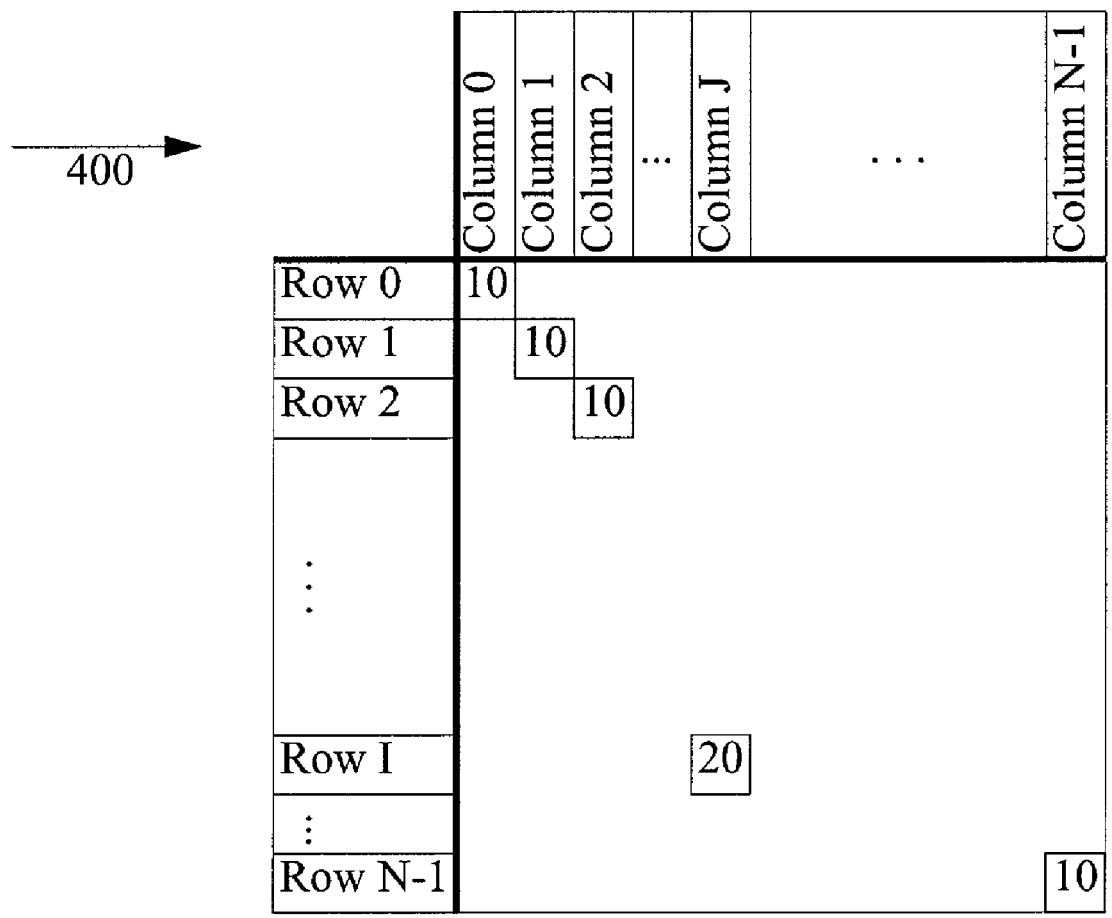
FIG. 4 shows an exemplary table storing the relative distance between the nodes in FIG. 1.

In one embodiment, the relative distance between nodes 110 is stored in a table 400 as shown in FIG. 4. For illustration purposes, both the rows and columns in table 400 are indexed from 0 to N−1 for N nodes, and the rows of table 400 represent the "from" nodes while the columns of table 400 represent the "to" nodes. Further, the distance value of a resource in a node to another resource in the same node is arbitrarily chosen as 10. However, any convenient value can be chosen. Because the value in the diagonal of table 400 indicates the distance from a resource to another resource in the same node, all values in the table diagonal are 10. Additionally, the distance between nodes 110 is a ratio to that value 10. For example, if it takes one second for two resources within the same node to communicate with each other and the two resources are assigned a distance value of 10, then if it takes two seconds for two resources in different nodes to communicate with each other, those nodes are assigned a distance value of 20. Similarly, if it takes three seconds for two resources in different nodes to communicate with each other, then those nodes are assigned a distance value of 30, etc. The distance between two nodes 110 may or may not be symmetrical. Symmetric indicates that the distance between a first node to a second node is the same as the distance between the second node to the first node. In contrast, asymmetric indicates that the distance between the first node to the second node is not the same as the distance between the second node to the first node. In the asymmetrical case, it may take, for example, two seconds for a node A to send data to a node B, but it may take three seconds for node B to send data to node A. In such conditions, the distance from node A to node B is 20 while the distance from node B to node A is 30. Because there are N nodes in the exemplary system 100, there are N**2 locations in the firmware table storing values representing the distances between the N nodes. Further, the distance from a node I to a node J is indexed in the table by (N*I+J).

In one embodiment, the relative distance between nodes 110 (e.g., information in table 400) is stored in a ROM using firmware, and this information is passed to operating system 102 at start-up. Consequently, this information is portable to various operating systems. Table 400 or system 100 as a whole is thus said to be platform or system neutral because table 400 can be used on different computer systems using different architectures. Alternatively, table 400 or system 100 is said to be operating system neutral because various operating systems can use the information in table 400.

In the foregoing specification, techniques of the invention have been described with reference to specific embodiments thereof. However, it will be evident that various modifications and changes may be made thereto without departing from the broader spirit and scope of the invention. Accordingly, the specification and drawings are to be regarded as illustrative rather than as restrictive.

What is claimed is:

1. A method for allocating computer resources, comprising the steps of:
    allocating a first resource of a first-resource type; and
    allocating a second resource of a second-resource type different from the first-resource type;
    wherein
        a distance from the second resource to the first resource is the shortest distance among distances between the first resource to resources of the second-resource type;
        the distance between the first resource and the second resource is selected from a group consisting of: a distance measured from one resource to another resource and a distance measured relative to a distance used as a reference;
        the first resource and the second resource are allocated to be assigned to a program;
        the distance between the computer resources is stored as firmware; and
        upon power-up, an operating system is provided, from the firmware, with the distances between the computer resources for use in allocating the first resource and the second resource.

2. The method of claim 1 wherein the distance between the first resource and the second resource is measured in time units.

3. The method of claim 1 wherein the distance between the first resource and the second resource is measured by the distance between nodes containing said first resource and second resource.

4. The method of claim 1 wherein the distance between the first resource and the second resource is provided by the time taken to communicate from the first resource to the second resource or the time taken to transfer data from the first resource to the second resource.

5. The method of claim 1 wherein the first resource and the second resource reside in a plurality of nodes each of which includes at least one resource being either an I/O device, a memory device, or a processor.

6. The method of claim 5 wherein the first resource and the second resources in a node are on a same bus or share a point-to-point link.

7. The method of claim 1 wherein the first resource is an input device associated with a storage device storing the program or storing data associated with the program.

8. The method of claim 1 further comprising the step of allocating a third resource of a third-resource type based on the shortest distance between the first resource to resources of the third resource type; or the shortest distance between the second resource and the resources of the third-resource type.

9. The method of claim 1 wherein the first resource is an I/O device connected to a storage device storing the program or storing data associated with the program.

10. A system, comprising:
    a first resource of a first resource type; and
    a second resource of a second resource type;
    wherein
        the first resource and second resource are selected based on a plurality of distances including distances between a plurality of first-type resources to a plurality of second-type resources;
        the plurality of distances are selected from a group consisting of: a distance measured from one resource to another resource and a distance measured relative to a distance used as a reference; and
        the plurality of distances are stored as firmware and provided to an operating system at power-up for use in selecting the first resource and the second resource.

11. The system of claim 10 wherein the plurality of distances are measured by the distance between nodes containing the first resources and nodes containing the second resource.

12. The system of claim 10 wherein the plurality of distances are measured in time units.

13. The system of claim 12 wherein the measured time units are provided by the time taken to communicate from the first resource to the second resource or the time taken to transfer data from the first resource to the second resource.

14. The system of claim 10 wherein resources including the first type resources and the second-type resources reside in a plurality of nodes each of which includes at least one resource being either an I/O device, a memory device, or a processor.

15. The system of claim 14 wherein resources in a node are on a same bus or share a point-to-point link.

16. The system of claim 10 wherein the plurality of distances between the first resource and the second resource are the shortest distances among the plurality of distances between a plurality of first-type resources to a plurality of second-type resources.

17. The system of claim 10 further comprising a third resource of a third-resource type wherein the third resource is selected based on the shortest distance between the first resource to a plurality of third-type resources; or the shortest distance between the second resource to the plurality of third type resources.

18. A computer-readable medium embodying instructions that perform a method for allocating computer resources, the method comprising the steps of:
  allocating a first resource of a first-resource type; and
  allocating a second resource of a second-resource type different from the first-resource type;
  wherein
    a distance from the second resource to the first resource is the shortest distance among distances between the first resource to resources of the second-resource type;
    the distance between the first resource and the second resource is selected from a group consisting of: a distance measured from the first resource to the second resource and a distance measured relative to a distance used as a reference;
    the first resource and the second resource are allocated to be assigned to a program;
    the distance between the first resource and the second resource is stored as firmware; and
    upon power-up of a system running an operating system, the operating system is provided, from the firmware, with the distances to be used in allocating the first resource and the second resource.

19. A method for allocating computer resources, comprising the steps of:
  providing a plurality of first resources of a first-resource type;
  providing a plurality of second resources of a second-resource type different from the first-resource type; and
  allocating a first resource of the first resource type and a second resource of the second-resource type;
  wherein
    a distance between the first resource and the second resource is the shortest distance among the distances between the plurality of first resources to the plurality of second resources;
    the distance between the first resource and the second resource is selected from a group consisting of: a distance measured from one resource to another resource and a distance measured relative to a distance used as a reference;
    the first resource and the second resource are allocated to be used by a program;
    distances between the first resource and the second resource is stored as firmware; and
    upon power-up of a system running an operating system, the operating system is provided, from the firmware, with the distances to be used in allocating the first resource and the second resource.

20. A system comprising:
  a plurality of nodes having resources;
  an operating system running on a processor in a node of the plurality of nodes; and
  firmware embodying relative distances between the plurality of nodes;
  wherein
    the relative distances between the plurality of nodes is selected from a group consisting of: a distance measured from one resource to another resource and a distance measured relative to a distance used as a reference;
    upon power-up, the operating system uses the relative distances between the plurality of nodes in the firmware to allocate resources to be used by a program.

21. The system of claim 20 further comprising an interconnect fabric connecting the plurality of nodes; the interconnect fabric includes node controller chips and cross-bar chips wherein
  a node-controller chip connects at least one I/O controller, one memory controller, a plurality of processors and a plurality of crossbar chips; and
  a crossbar chip, on a first side, connects to at least a node controller chip, and, on a second side, connects to at least either a crossbar chip or another interconnect chip.

22. The system of claim 20 wherein a node of the plurality of nodes includes a node-controller chip connecting at least an I/O controller, a memory controller, a processor, and another node.

23. The system of claim 20 wherein a node of the plurality of nodes includes one or a combination of one or more of an I/O controller connected to I/O devices, a memory controller connected to memory arrays, and one or more processors.

24. The system of claim 20 wherein a node of the plurality of nodes includes a bus connecting an I/O controller connected to I/O devices, a memory controller connected to memory arrays, a plurality of processors, and a bridge connecting to another node of the plurality of nodes.

25. The system of claim 20 wherein an I/O device is first allocated, then a memory array is allocated; a distance between the memory array to the I/O device is the shortest distance among a plurality of distances between a plurality of memory arrays to the I/O device.

26. The system of claim 25 wherein a processor is allocated; a distance between the processor to the I/O device is the shortest distance among a plurality of distances between a plurality of processors to the I/O device.

27. The system of claim 25 wherein a processor is allocated; a distance between the processor to the memory array is the shortest distance among a plurality of distances between a plurality of processors to the memory array.

* * * * *